United States Patent [19]

Seto et al.

[11] Patent Number: 4,878,799
[45] Date of Patent: Nov. 7, 1989

[54] AUTOMATIC MACHINE FOR UNLOADING FILM SHEET FROM MAGAZINE

[75] Inventors: Izumi Seto; Mikio Tsuyuki; Yutaka Takashima, all of Kanagawa, Japan

[73] Assignee: Fuji Photo Film Co., Ltd., Kanagawa, Japan

[21] Appl. No.: 141,395

[22] Filed: Jan. 7, 1988

[30] Foreign Application Priority Data

Jan. 7, 1987 [JP] Japan ............................ 62-668[U]
Mar. 17, 1987 [JP] Japan ............................ 62-62308

[51] Int. Cl.⁴ .................................................. B65G 65/00
[52] U.S. Cl. .................................... 414/331; 53/266 R; 187/20; 271/9; 414/411,416
[58] Field of Search ............... 414/331, 403, 404, 411, 414/416, 121, 280; 53/266 R, 266 C; 187/20; 271/9

[56] References Cited

U.S. PATENT DOCUMENTS

| | | | |
|---|---|---|---|
| 3,150,263 | 9/1964 | Catlin | 53/266 C |
| 3,809,259 | 5/1974 | Pipes | 414/280 |
| 4,049,142 | 9/1977 | Azzaroni | 414/403 X |
| 4,354,336 | 10/1982 | Azzaroni | 414/411 X |
| 4,480,423 | 11/1984 | Muller | 53/266 R |
| 4,539,794 | 9/1985 | Azzaroni | 53/266 R X |
| 4,588,349 | 5/1986 | Reuter | 414/411 X |
| 4,590,738 | 3/1986 | Hosel et al. | 414/411 X |
| 4,720,227 | 1/1988 | Eberle | 414/121 X |

FOREIGN PATENT DOCUMENTS

| | | | |
|---|---|---|---|
| 3219784 | 12/1982 | Fed. Rep. of Germany | 271/9 |
| 75770 | 6/1977 | Japan | 414/121 |
| 1175810 | 8/1985 | U.S.S.R. | 414/280 |

Primary Examiner—David A. Bucci
Attorney, Agent, or Firm—Sughrue, Mion, Zinn, Macpeak & Seas

[57] ABSTRACT

A plurality of magazines each of which contains a plurality of film sheets of a type different from those contained in the other magazines are accommodated in movable trays. These movable trays are disposed within an elevator in such a manner as to be movable with respect to the elevator from a retracted position to a film unloading position. Each of the movable trays has a hook. When the elevator is moved to a desired position, an insert member such as a rod enters the hook located at that position so as to move the tray to the film unloading position at which the film sheet is taken out of the magazine.

26 Claims, 13 Drawing Sheets

F I G. 4
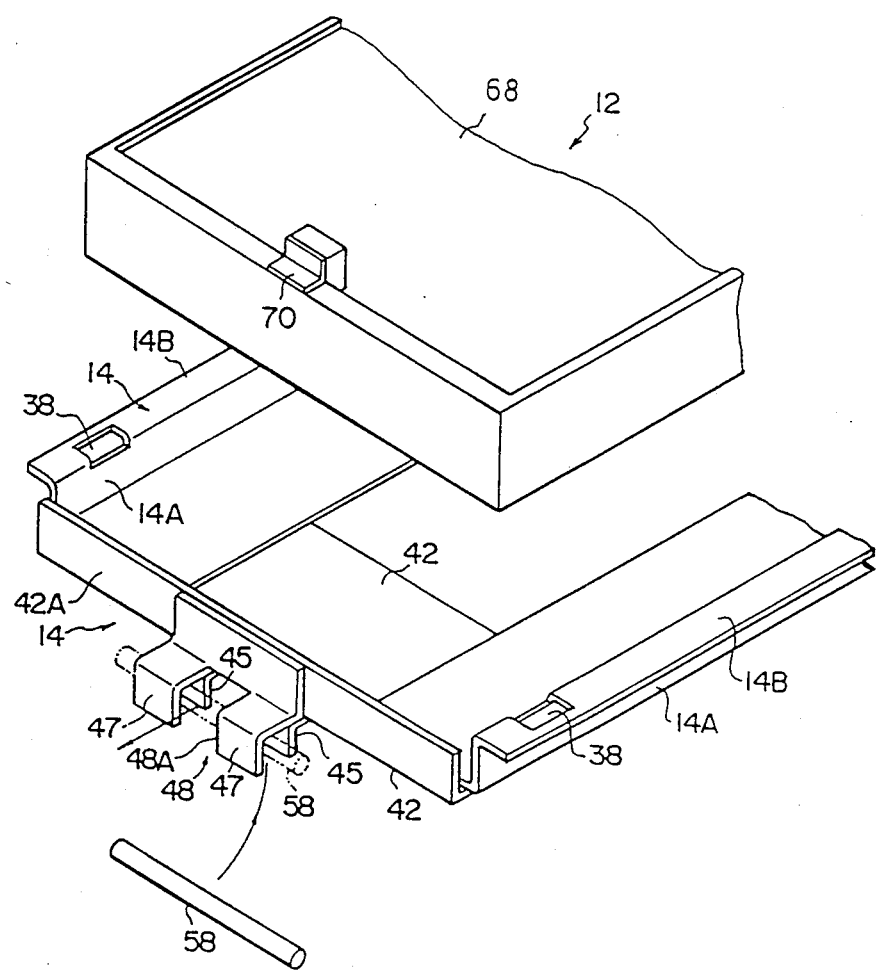

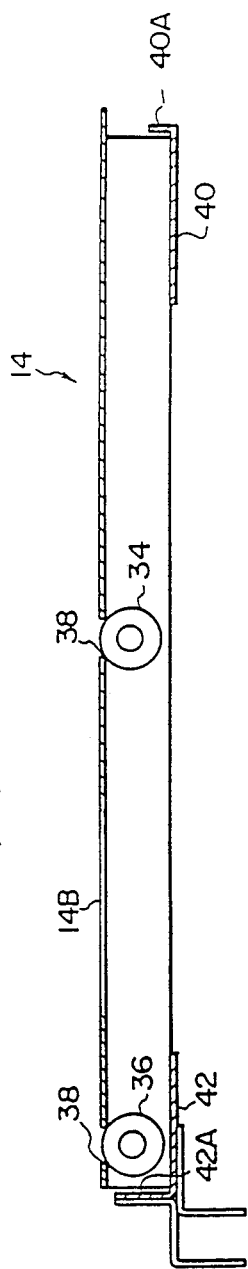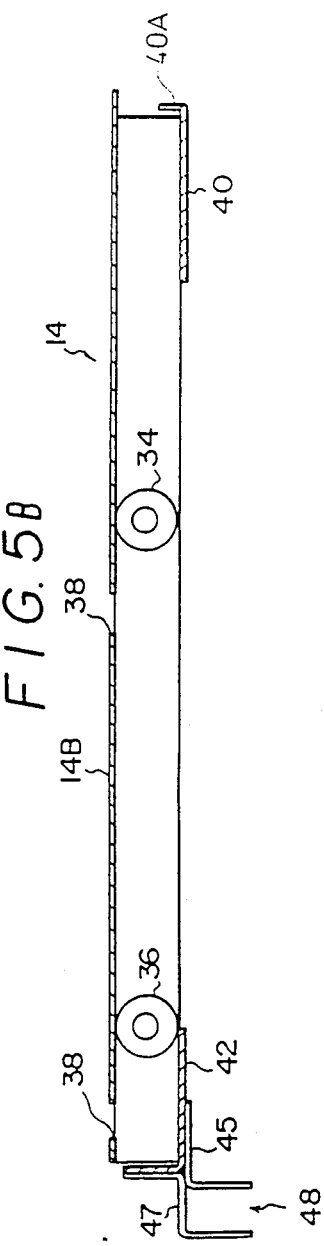

AUTOMATIC MACHINE FOR UNLOADING FILM SHEET FROM MAGAZINE

BACKGROUND OF THE INVENTION

1. Field of the Invention

The present invention relates to an automatic machine for unloading a film sheet from a magazine, which can be employed in combination with a machine for supplying the unloaded sheet from the magazine to, for example, an X-ray photographing apparatus or a cassette.

2. Description of the Related Art

X-ray film sheets are sequentially supplied to an X-ray photographing apparatus or a cassette from magazines containing a plurality of X-ray film sheets through an automatic machine for unloading a film sheet from a magazine.

Generally, the automatic machine houses a plurality of magazines which respectively contain a plurality of film sheets of different sizes and types, and these film sheets are sequentially unloaded by a film unloading mechanism of the automatic machine from the magazines when they are positioned so as to face the film unloading mechanism. In that case, a magazine which contains film sheets of a desired size or kind is selectively aligned with the film unloading mechanism to allow a film sheet to be taken out. Therefore, if only one film unloading mechanism is provided on the automatic machine having a plurality of magazines, a magazine containing film sheets of a desired type must be selected from the plurality of magazines and driven (moved) to a position where the film sheet is unloaded from the selected magazine by the film unloading mechanism.

As a magazine driving mechanism for driving the magazine to the position must be arranged so as to correspond to the number of magazines, a complicated construction, large number of parts, and high production costs are required.

SUMMARY OF THE INVENTION

Accordingly, an object of the present invention is to provide an automatic machine for unloading a film sheet from a magazine of simple construction capable of moving any magazine to a position at which a film sheet is to be unloaded from the magazine.

Another object of the present invention is to provide an automatic machine for unloading a film sheet from a magazine capable of exactly positioning any of several magazines where the film sheet is unloaded.

To achieve these objects, the present invention provides an automatic machine for unloading a film sheet from magazine including: a plurality of movable trays, each of which is loaded with one of a plurality of magazines containing film sheets; an elevator for moving the movable trays to locate a selected one of the magazines to a retracted position from which the selected magazine is capable of being moved to a film unloading position where the film sheets can be unloaded from the selected magazine; a film unloading preparation means including tray driving means for driving the movable tray which loads the selected magazine to move it between the retracted position and the film unloading position and engaging means including a hook and an insert member which enters the hook to transmit the driving force of the tray driving means to the movable tray for loading the selected magazine; and a film unloading mechanism for unloading the film sheet from the selected magazine located at the film unloading position.

With this arrangement, among the plurality of movable trays, the movable tray for loading the selected magazine is moved to the retracted position and it is then moved forward from the retracted position to the film unloading position by the film unloading preparation means.

BRIEF DESCRIPTION OF THE DRAWINGS

FIG. 4 is a perspective view of a movable tray and its associated parts;

FIGS. 5 (A) and (B) are cross-sectional side views of the movable tray which are brought into contact with support rollers;

DESCRIPTION OF THE PREFERRED EMBODIMENTS

Figure 1:
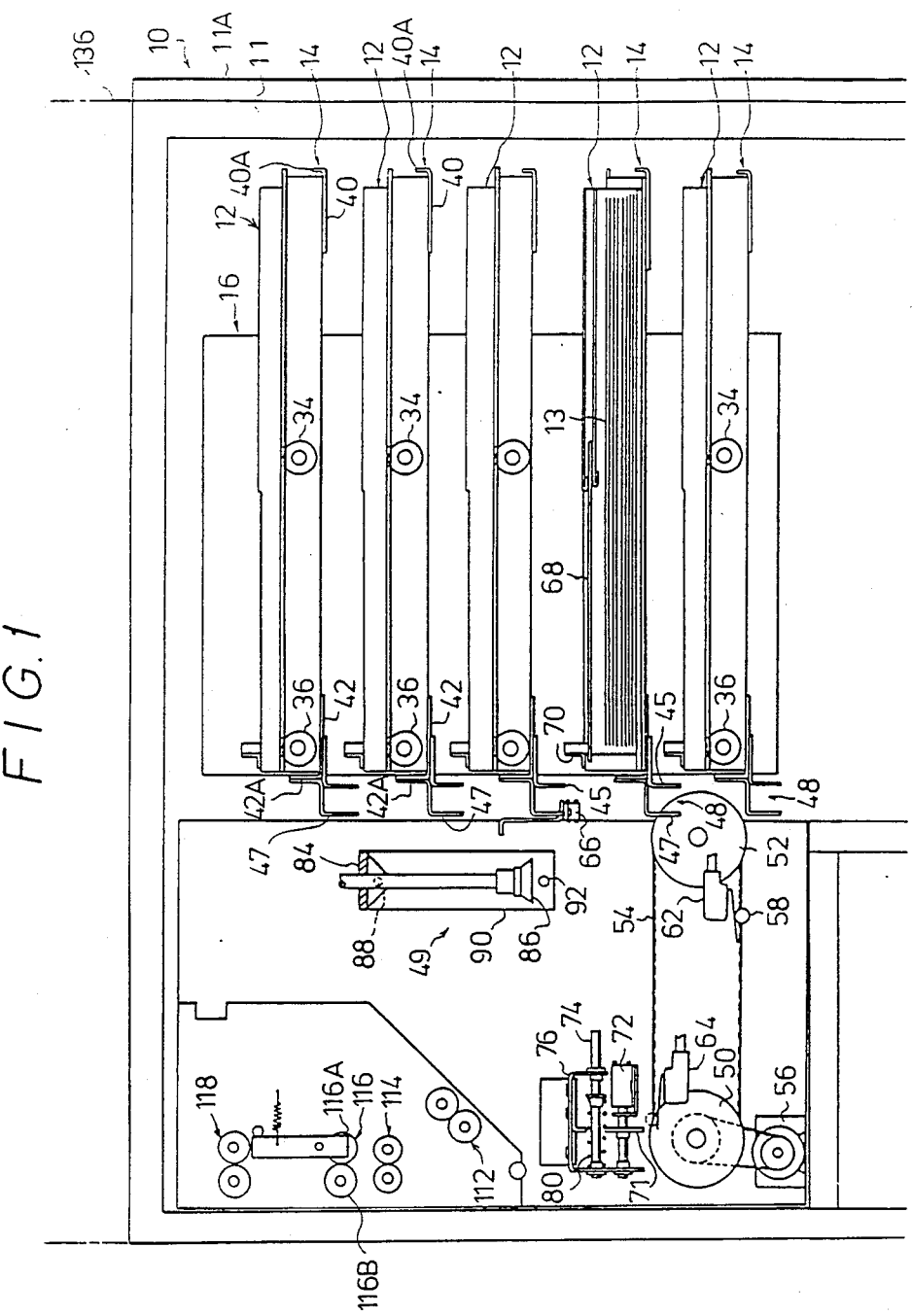
FIG. 1 is a cross-sectional front view of an automatic machine for unloading film sheet from magazine, showing a first embodiment of the present invention.
Figure 2:
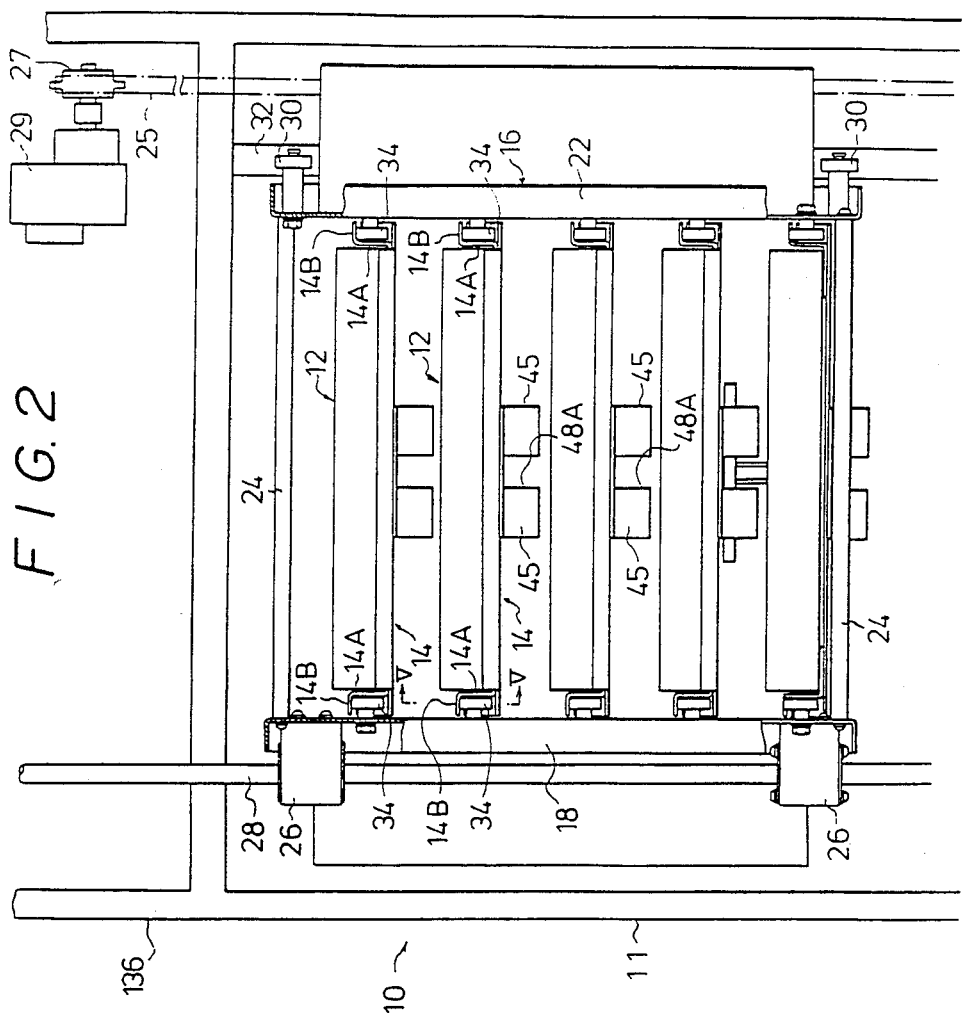
FIG. 2 is a side elevational view of the automatic machine of FIG. 1.

FIGS. 1 and 2 show an automatic machine for unloading a film sheet from a magazine, showing a first embodiment of the present invention. The automatic machine 10 has a frame 11 which houses a large number of movable trays 14 (see FIGS. 1 and 2), each of which accommodates a magazine 12. The movable trays 14 are supported by an elevator 16 at positions spaced apart from each other at fixed intervals in the vertical direction. The front side (the right side as viewed in FIG. 1) of the frame 11 is provided with a lid 11A which is opened when the magazines 12 are being changed but is usually closed so as to protect the interior of the frame.

Figure 3:
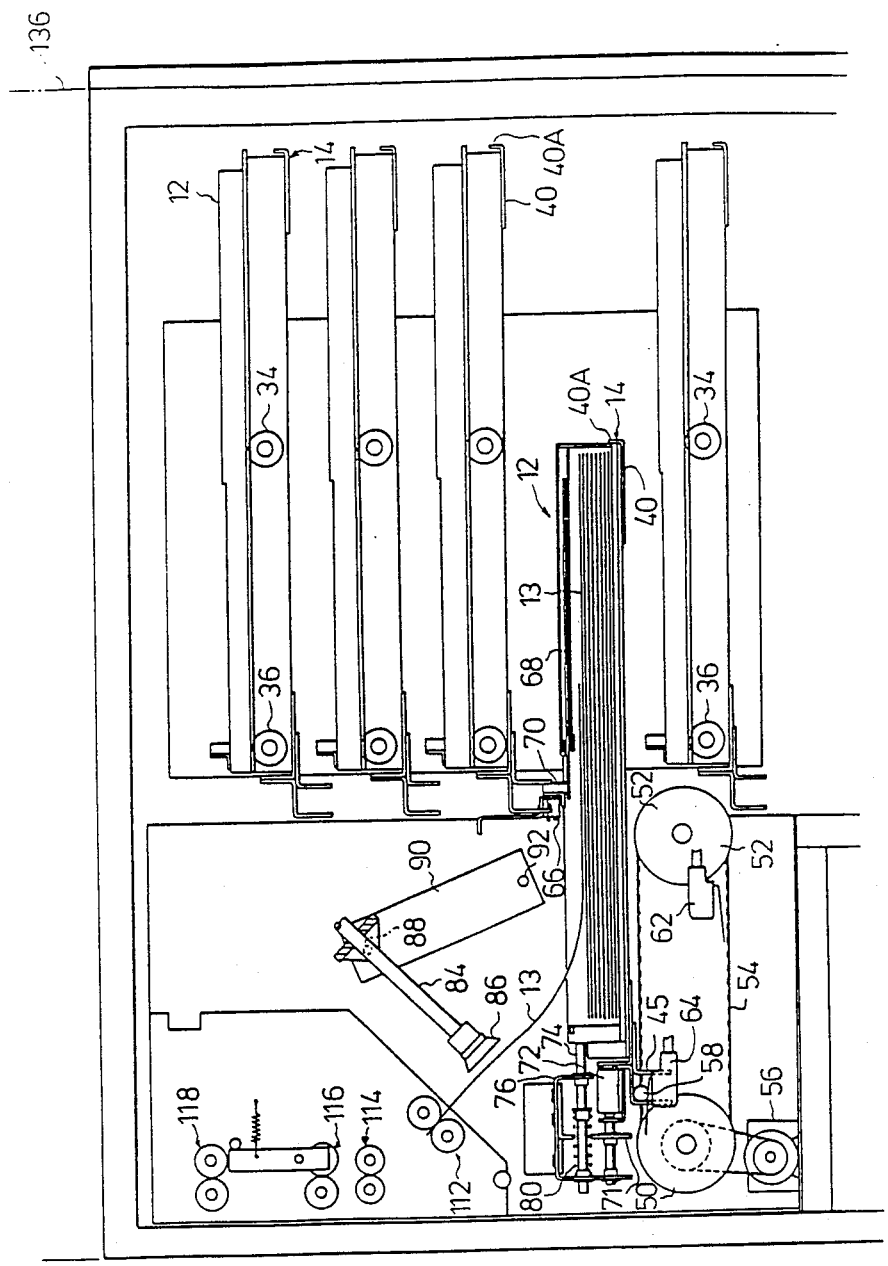
FIG. 3 illustrates the operation of the automatic machine of FIG. 1.

Each of the magazines 12 has a hollow box-shaped form. The rear half of the top of the magazine 12 is provided with a lid 68 which can slide so as to open the rear half of the top of the magazine 12, as shown in FIG. 3. Each of the magazines 12 accommodates a plurality of film sheets of a kind which is different from those accommodated in the other magazines (in size and type). The magazine 12 is provided with a mark (not shown) such as a bar code which represents the contents of the magazine, and which can be detected by a sensor.

As shown in FIG. 2, the elevator 16 has a pair of side walls 18 and 22. Supporting shafts 24 extend between the side walls, by means of which the side walls are positioned vertical and parallel to each other.

The elevator 16 also has a guide rod 28 passing through blocks 26 mounted in a projecting manner on the side wall 18. The guide rod 28 is erect, and the upper and lower ends thereof are supported on the frame 11.

The side wall 22 rotatably supports rollers 30 in such a manner as to be slidable along a vertically extending guide rail 32 fixed to the frame 11. Thus, the rollers 30 are able to serve as guide means for the vertical movement of the elevator 16.

Part of an endless chain 25 which is extended in the vertical direction is secured to the side wall 22. The endless chain 25 is wound around a pair of sprocket wheels 27 (the lower one not being shown in FIG. 2). The sprocket wheel 27 is rotated by a motor 29, so that the elevator 16 is moved up and down.

Each of the movable trays 14 mounted on the elevator 16 has vertical walls 14A at two lateral ends (right and left ends as viewed in FIG. 2), as well as horizontal walls 14B each of which is bent at a right angle with respect to the vertical wall 14A and extends from the upper end of the vertical wall 14A in the horizontal direction. The horizontal walls 14B are mounted on guide rollers 34 and 36 rotatably supported on the side walls 18 and 22, respectively, so that the movable tray 14 is supported on the elevator 16 through the guide rollers 34 and 36.

Each of the horizontal walls 14B is provided with a pair of notches 38, as shown in FIG. 5(A) and 5(B). When the portions of each of the horizontal walls other than the notches 38 come into contact with the guide rollers 34 and 36, the movable tray 14 can be moved, with its horizontal walls 14B located on the guide rollers 34 and 36 rotating the corresponding set of guide rollers 34 and 36. In contrast, when the notches 38 face the guide rollers 34 and 36, part of each set of guide rollers 34 and 36 enters the notches 38, thus lowering the movable tray 14 slightly. In this state, the horizontal movement of the movable tray 14 is restricted, and positioning of the movable tray 14 at a retracted position is achieved.

The bottom of each of the movable trays 14 is provided with bottom plates 40 and 42 at the forward and rear ends (right and left ends as viewed in FIG. 1). The bottom plates 40 and 42 have vertical portions 40A and 42A, respectively, which face the forward and rear ends of the magazine 12 received in the movable tray 14, so as to limit the movement of the magazine 12 in the movable tray 14 in the longitudinal direction hereof (right and left as viewed in FIG. 1). Movement of the magazine 12 in the movable tray 14 in the lateral direction is limited by the vertical walls 14A.

The interval at which the vertical portions 40A and 42A are mounted is slightly larger than the longitudinal length of the magazine 12. This facilitates accommodation of the magazine 12 in the movable tray 14, and at the same time enables the magazine to be moved by a small distance within the movable tray 14.

The rear end of each of the movable trays 14 is provided with a hook 48. The hook 48 has bending plates 45 and 47 fixed to the bottom plate 42. More specifically, the distal end portions of the bending plates 45 and 47 are made parallel and are directed downward so that the movable tray 14 is capable of receiving a driving force applied through the hook 48. The central portion of each of the bending plates 45 and 47 in the lateral direction forms a notch 48A.

The frame 11 also incorporates a pair of pulleys 50 and 52 which constitute part of a film unloading preparation means 49, as shown in FIG. 1. An endless timing belt 54 is stretched between the pulleys 50 and 52. The pulley 50 is coupled to a motor 56 so as to enable the belt 54 to be moved reciprocatingly by the rotational force of the motor 56. Thus, the pulleys 50, 52, the endless belt 54 and the motor 56 constitute at least part of a tray driving means.

The central portion of a driving rod 58 is mounted substantially horizontally on part of the endless timing belt 54, so that the driving rod 58 can move together with the endless timing belt 54 a it is moved by the rotation of the pulley 50.

The driving rod 58 can be moved from the position shown by the solid line in FIG. 1 to a state shown in FIG. 3 by the counterclockwise rotation of the pulleys 50 and 52. The respective ends of this movement stroke are detected by limit switches 62 and 64.

Therefore, the driving rod 58 enters the hook 48 of the movable tray 14 aligned with the film unloading mechanism when the pulleys 50 and 52 are rotated in the counterclockwise direction, by means of which the hook 48 and the movable tray 14 on which the hook 48 is provided are moved from the retracted position shown by the solid line in FIG. 1 to the film unloading position shown in FIG. 3.

A magnet 66 is mounted on the frame 11 above the pulley 52 in such a manner that it is aligned with the central portion of the magazine 12 in the lateral direction, i.e., it is aligned with a magnetic block 70 (FIG. 4) projecting from the lid 68 of the magazine 12. Therefore, the magnetic block 70 is attracted to the magnet 66 while the magazine 12 is being moved from the retracted position shown in FIG. 1 to the film unloading position shown in FIG. 3, by means of which the lid 68 is moved relative to the magazine 12 so as to open the same.

On the other hand, when the magazine 12 moves back from the film unloading position shown in FIG. 3 to the retracted position shown in FIG. 1, the magnet 66 holds the magnetic block 70 by its magnetic force, so that the lid 68 is moved relative to the magazine 12 in the opposite direction so as to close it.

A magnet 72 which attracts the movable tray is mounted on the frame 11 through a bracket 71 above the pulley 50. The movable tray attracting magnet 72 serves to retain the vertical portion 42A of the bottom plate 42 of the movable tray 14 by means of its magnetic force when the magazine 12 is moved to the film unloading position shown in FIG. 3 from the retracted position.

A pushing rod 74 is mounted through a bracket 76 horizontally above the movable tray attracting magnet 72 in such a manner as to be movable in the axial direction. The pushing rod 74 is caused to project toward the magazine 12 by a compression coil spring 80 provided between the pushing rod 74 and the bracket 76.

Therefore, while the movable tray 14 is attracted to the movable tray attracting magnet 72, the magazine 12 in the movable tray 14 is moved forward (in the rightward direction as viewed in FIG. 3) by the pushing rod 74 and the compression coil spring 80, and is caused to abut against the vertical portion 40A of the bottom plate 40. Thus, positioning of the magazine 12 located at the film unloading position can be achieved by the pushing rod 74, even if the magazine 12 is slightly movable within the movable tray 14 in the longitudinal direction.

The urging force of the compression coil spring 80 is set slightly smaller than the magnetic force with which the movable tray 14 is attracted to the movable tray attracting magnet 72. This enables the movable tray attracting magnet 72 to attract the movable tray 14 in the state shown in FIG. 3 despite the existance of the urging force of the pushing rod 74. When the pulleys 50 and 52 are rotated clockwise in the state shown in FIG. 3, the compression coil spring 80 helps the driving rod 58 move the movable tray 14 to its retracted position.

Above the magazine 12 located at its film unloading position is disposed a film unloading arm 84. The lower end of the film unloading arm 84 is provided with a sucker 86 (which is constituted by suction cups 86A, 86B, 86C, and 86D shown in FIG. 6), and the upper end is pivotally fixed to pivot arms 90 by pins 88. The lower ends of the pivot arms 90 are pivotally supported to the frame 11 by pins 92.

Therefore, the film unloading arm 84 can be pivoted about the pins 88 and 92 so as to enable the suction cup 86 to suck and unload a X-ray film 13 contained in the magazine 12.

Figure 6:
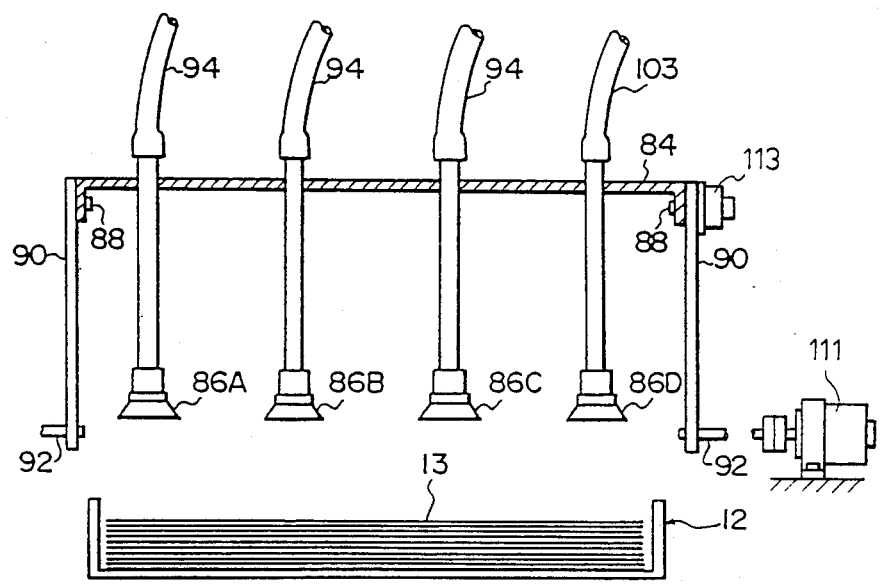
FIG. 6 is a cross-sectional side view of a sucker and X-ray film sheets, illustrating the relationship therebetween.
Figure 7:
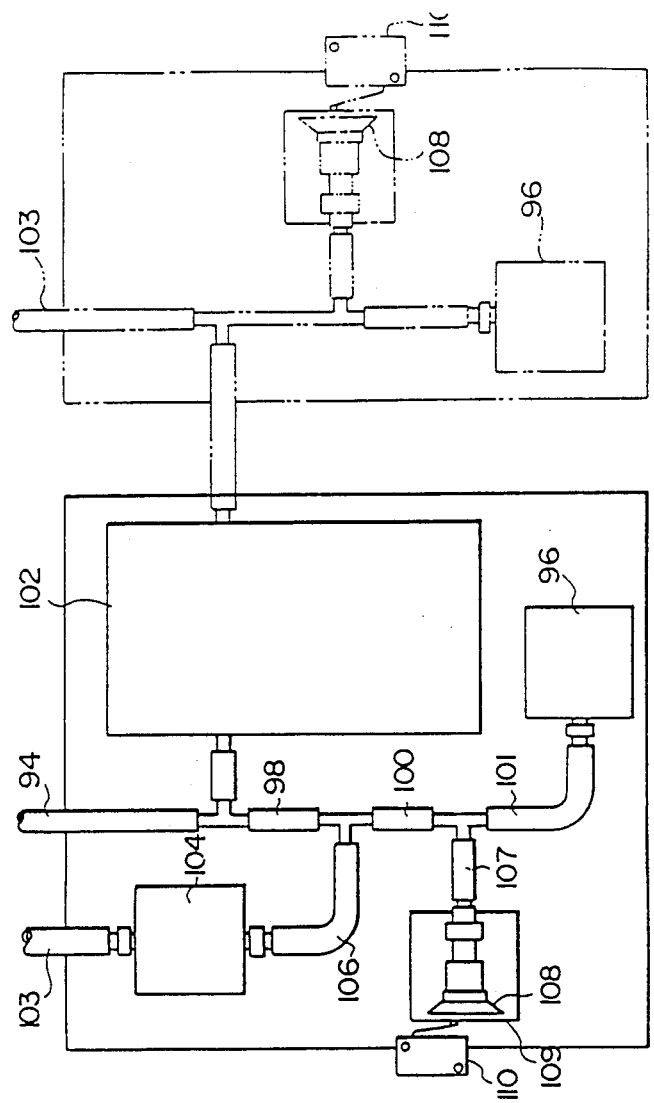
FIG. 7 is a plan view of pipings used to supply a vacuum to the sucker.

As shown in FIG. 6, the suction cups 86A, 86B, and 86C communicate with respective vacuum pipes 94. These vacuum pipes 94 are brought together to form a single pipe which communicate with an electromagnetic valve 96 via a vacuum pump 102 and vacuum pipes 98 and 100, and 101, as shown in FIG. 7. The suction cup 86D communicates with the connecting portion between the pipes 98 and 100 via a vacuum pipe 103, an electromagnetic valve 104, and a vacuum pipe 106.

When operated, the vacuum pump 102 generates a vacuum in the suction cups 86A to 86C via the vacuum pipes 94 and in the suction cup 86D via the vacuum pipes 98, 106, 103, respectively. The electromagnetic valve 104 disconnects the sucker 86D from the vacuum pump 102 when it is closed. The electromagnetic valve 96 which is usually closed releases the vacuum in the vacuum pipe 101 when it is opened, thereby releasing the vacuum in the suction cup 86.

Therefore, when the vacuum pump 102 is operated and the electromagnetic valves 96 and 104 are both closed, the vacuum is generated in the suction cups 86A, 86B, and 86C to suck and unload the narrow X-ray film 13. To handle an X-ray film 13 having a large width, the electromagnetic valve 104 is opened to generate the vacuum in the suction cup 86D.

A suction cup 108 communicates a portion between the vacuum pipes 100 and 101 via a vacuum pipe 107. The suction cup 108 has a flexible wall 109 which is caused to deform by the vacuum from the vacuum pipe 100, this deformation being detected by a limit switch 110. Therefore, the conditions of vacuum generated in the suction cups 86A to 86D can be detected using the limit switch 110. Thus, the suction cup 86, the pivot arms 90, the vacuum pump 102 and so on constitute a film unload mechanism.

In this embodiment, since the vacuum pipe 103 for transferring the vacuum to the suction cup 86D communicates with the connecting portion between the vacuum pipe 98 and the vacuum pipe 100 via the electromagnetic valve 104 and the vacuum pipe 106, the conditions of the vacuum in all the suction cups can be detected using the suction cup 108 and the limit switch 110. In other words, if the vacuum pipe leading from the suction cup 86D is connected to the vacuum pump 102 via a piping system other than that for the suction cups 86A to 86C, the suction cup 108 and the limit switch 110 cannot be used to detect the conditions of the vacuum in all the suction cups, and a suction cup and a limited switch must be provided for each piping system, as shown by the imaginary line in FIG. 7.

The film unloading arm 84 and the pivot arms 90 are driven by the rotation of motors 111 and 113, by means of which the suction cup 86 is raised in the state wherein it is sucking the vicinity of the end of the X-ray film sheet 13 and convey the forward end of the X-ray film sheet 13 to a pair of conveying rollers 112, as shown in FIG. 3. The conveying rollers 112 are arranged to feed the conveyed X-ray film sheet 13 to pairs of guide rollers 114, 116, and 118 by a motor (not shown).

Figure 8:
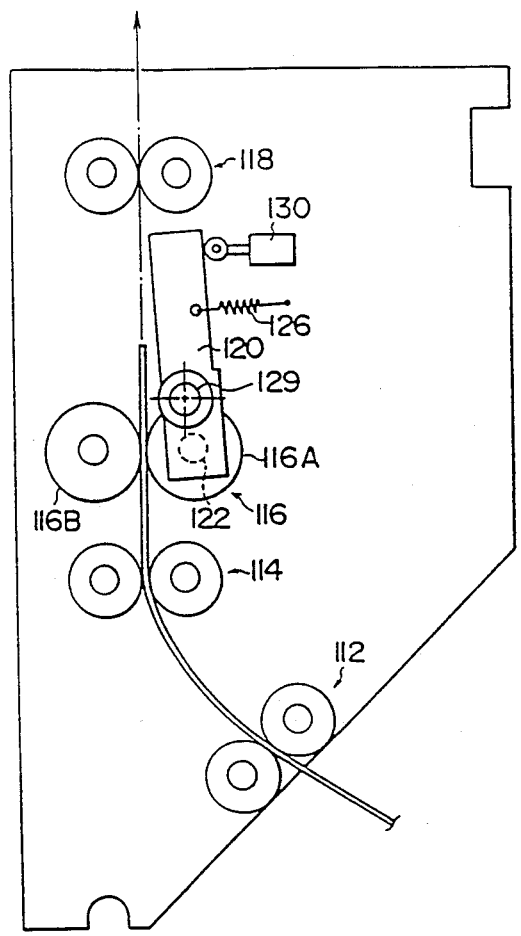
FIG. 8 is a partially enlarged view of the automatic machine of FIG. 1.
Figure 9:
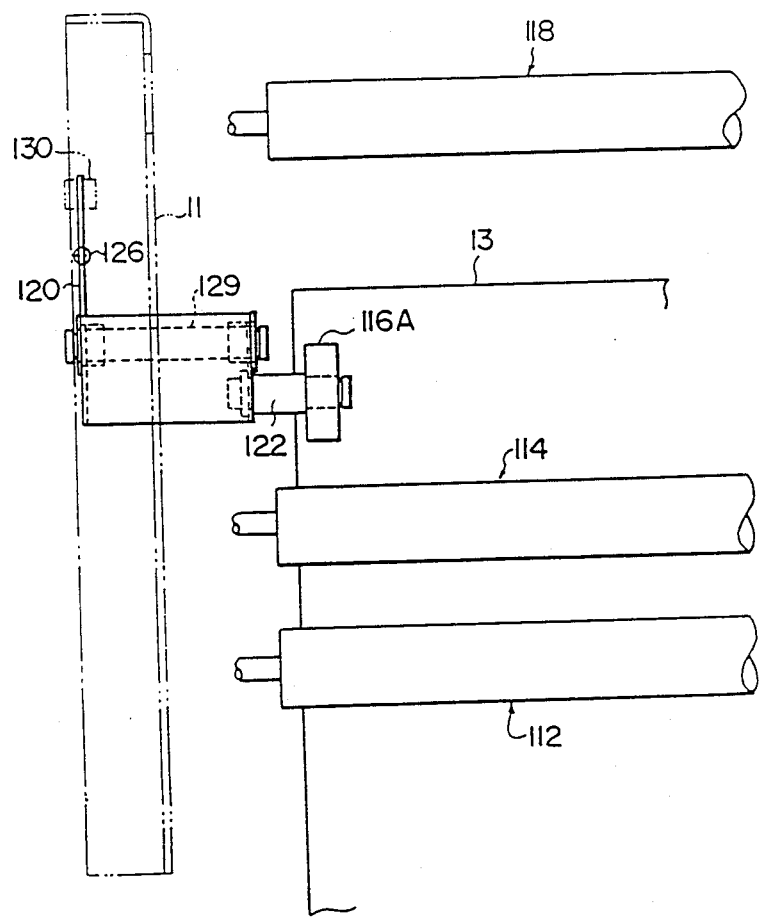
FIG. 9 is a view when looking from the right side in FIG. 8.

As shown in FIG. 8 and 9, a roller 116A of the guide roller pair 116 is pivotally supported to the end of a pivot arm 120 by a pin 122. The intermediate portion of the pivot arm 120 is pivotally supported to the frame 11 by a pin 129. The roller 116A is pressed against the other roller 116B by the urging force of a tension coiled spring 126.

A limit switch 130 is provided on the other end of the pivot arm 120, i.e., at a position which is separated from the pin 129 by a distance several times as large as the one between the pins 122 and 129. Therefore, if the X-ray film sheet 13 raised between the rollers 116A and 116B has the thickness larger than that of two sheets or more, i.e., if a plurality of sheets 13 are unloaded out of the magazine 12 in the state wherein they are closely attached with each other, the limit switch 130 which is capable of detecting the change in the thickness of the film sheet in a magnified manner by virtue of the leverage detects this abnormal state, and operates an alarming device (not shown).

Apart from the other roller pairs, the rollers 116A and 116B are made to correspond to only the edge of the sheet 13 in the lateral direction, as shown in FIG. 9. Thus, since the rollers 116A and 116B are adapted to grip only the edge of the film sheet 13 in the lateral direction, accurate detection of change in the film sheet thickness is possible, even if the sheets have different widths.

Above the X-ray film supplying apparatus 10 is disposed a cassette opener loader 136 through which the sheet 13 unloaded out of the magazine 12 is charged to a cassette (not shown) and the exposed film sheet in the cassette is taken out thereof. A developing device of the sheets 13 may be disposed adjacent to the cassette opener loader 136, if necessary.

The operation of this embodiment will now be described below.

The magazines 12 each of which contains a plurality of the X-ray film sheets 13 having a different size from those in the other magazines, are loaded on their associated movable trays 14, and in this state the lid 11A of the frame 11 is closed. At that time, each of the movable trays 14 is located at its retracted position, as shown in FIG. 1, with its notches 38 aligned with the guide rollers 34 and 36 as shown in FIG. 5 (A), so that the movable tray 14 can be prevented from unintended movement in the forward or backward direction.

When an image is to be exposed on the X-ray film sheet 13 of a given size, a control device (not shown) serves to move the elevator 16 vertically so as to align the movable tray 14 loaded with the magazine 12 containing the sheets 13 of that size (e.g., the fourth magazine 12 from the top in FIG. 1) with the film unloading mechanism 49.

At this time, the pulley 52 interferes with each of the hooks 48, if they are viewed from the front of FIG. 1. However, since each of the hooks 48 has the notch 48A, as shown in FIG. 4, the pulley 52 is made to pass through the notch 48A, and the movement of the elevator 16 in the vertical direction is not obstructed.

Therefore, as the pulleys 50 and 51 are rotated counterclockwise from the state shown in FIG. 1 by the driving force of the motor 56, the driving rod 58 moves up in an arc form along the pulley 52, enters the hook 48 at its highest position, and then moves on a straight line from the pulley 52 to the pulley 50, by means of which the magazine 12 is moved from the retracted position shown in FIG. 1 to the film unloading position in FIG. 3.

When the movable tray 14 carrying the magazine 12 is moved from the retracted position to the film unloading position, it is raised slightly, and is then readily moved in the horizontal direction because its horizontal walls 14B are riding on the guide rollers 34 and 36.

While the movable tray 14 with the magazine 12 is being moved from the retracted position to the film unloading position, the magnetic block 70 of the lid 68 of the magazine 12 abuts against the magnet 66 and is stopped there, moving the lid 68 relative to the magazine 12 and opening the top of the magazine 12.

The movable tray 14 which has been moved to the film unloading position is attracted to the movable tray attracting magnet 72 while the forward end of the magazine 12 is pushed back by the pushing rod 74 which is urged by the compression coiled spring 80 so that the magazine 12 is caused to abut against the vertical portion 40A of the bottom plate.

Therefore, the position of the magazine 12 with respect to the movable tray 14 is specified so as to ensure that the vicinity of the end of the sheet 13 is sucked by the suction cups 86A to 86D when the suction cups 86A to 86D are lowered by the pivot of the film unloading arm 84 and pivot arms 90.

If the sheet 13 to be unloaded has a small width, the electromagnetic valves 96 and 104 are both closed, and the only the suction cups 86A to 86C are used to suck the sheet 13. If the width of the sheet 13 is large, the electromagnetic valve 104 is opened so as to generate the vacuum in the suction cup 86D in addition to the suction cups 86A to 86C. Thus, the vacuum can be generated over the entire width of the sheet 13, even if the width of the film sheet 13 differs.

After the film sheet 13 has been sucked, the forward end of the sheet 13 is conveyed between the guide rollers 114 by the pivot of the film unloading arm 84 and the pivot arms 90.

The guide roller 114 serves to feed the sheet 13 further upward between the pairs of guide rollers 116 and 118 by the driving force of the motor (not shown). If a plurality of closely attached sheets 13 have been unloaded out of the magazine 12, the roller 116A is separated from the roller 116B by a gap which corresponds to the thickness of the sheets unloaded, and this increase in the gap is detected by the limit switch 130 in a magnified manner by virtue of the leverage of the pivot arm 120.

This detection may be used to actuate an alarm (not shown), or these sheets may be discharged from the apparatus as erroneous film sheets. Thereafter, the operation of the apparatus 10 is restarted by an operator to unload an X-ray film sheet 13 from the magazine 12.

The sheet 13 which has been raised through the guide rollers 116 is fed to the cassette opener loader 136, from which the sheet 13 is charged to the cassette (not shown).

If an X-ray film sheet 13 of a different size is supplied subsequently, the motor 56 is reversely rotated, so that the driving rod 58 returns the magazine 12 together with its movable tray 14 to its retracted position. At this time, since the magazine 12 is being pushed toward the retracted position by the pushing rod 74 which is urged by the compression coiled spring 80, only a small force is required to move the movable tray 14 to its retracted position.

While the movable tray 14 is being returned to its retracted position, the magnetic block 70 remains attracted to the magnet 66, so that the lid 68 is moved relative to the magazine 12 so as to close the top thereof.

When the movable tray 14 has been returned back to its retracted position, the notches 38 are aligned with the guide rollers 34 and 36 again, lowering the movable tray 14 slightly and positioning it in the horizontal direction.

Subsequently, the elevator 16 is moved vertically by a desired height, so as to allow the magazine 12 containing X-ray film sheets 13 of a desired size to be aligned with the film unloading mechanism 49, and the same operation is then repeated to unload a desired film sheet from the magazine 12.

In the above-described embodiment, the hook 48 is mounted on each of movable trays 14, and the driving rod 58 is driven by the motor 56. However, the driving rod 58 may be mounted on the movable tray 14, and the hook 48 may be driven by the motor 56. A combination of any members may be employed in place of the combination of hook 48 and driving rod 58, if one of the members has a hook-like form, like the hook 48. In this embodiment, the suction cup 108 and the limit switch 110 are used to detect the conditions of the vacuum. However, a detecting means having a different structure from that may also be employed.

A second embodiment of the present invention will be described below with reference to FIGS. 10 to 13. This embodiment is effective to move the elevator 16 accommodating the plurality of magazines 12 up or down quickly and accurately so as to allow any of the magazines 12 to be aligned with the film unloading mechanism 49.

Figure 10:
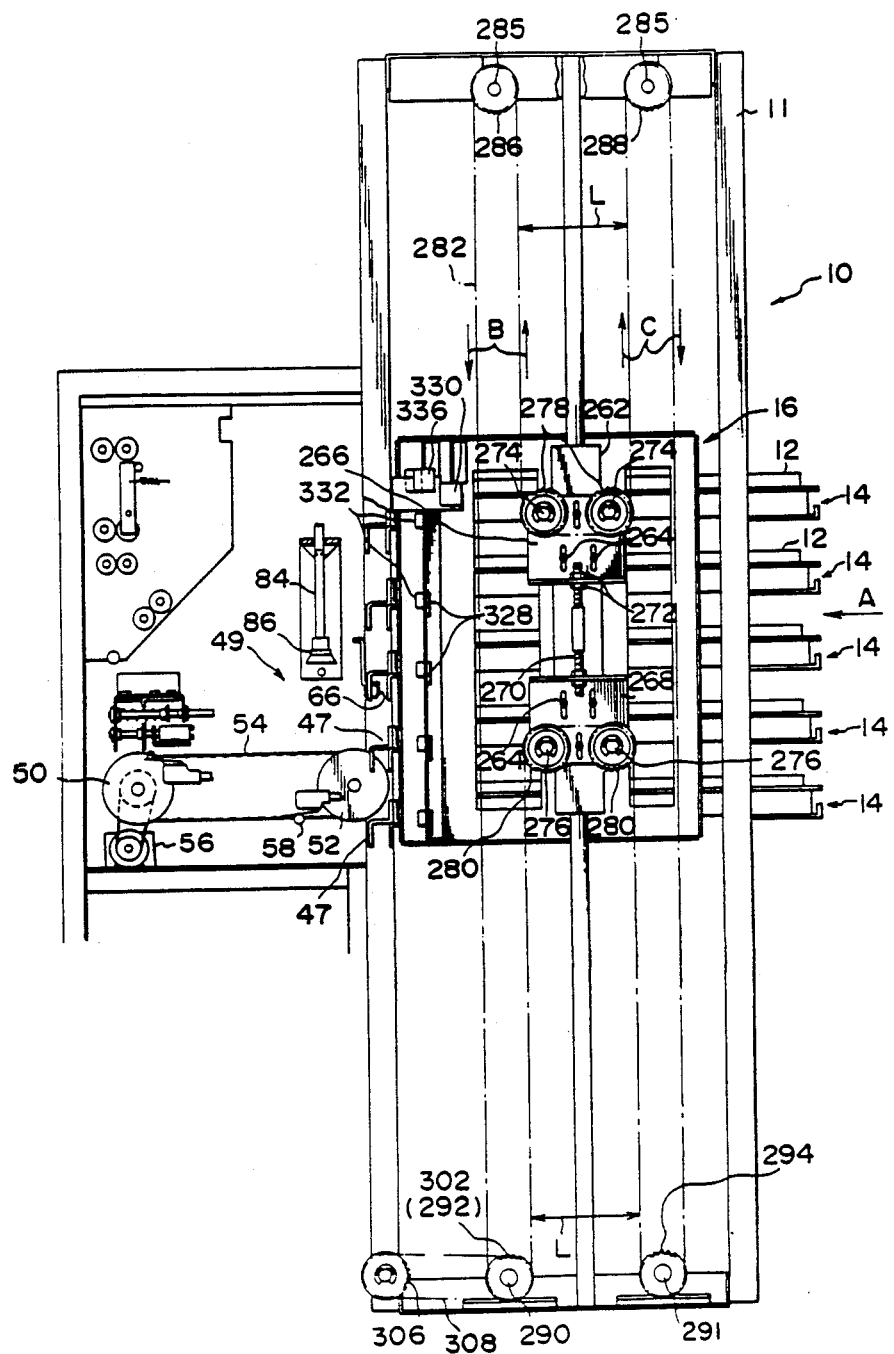
FIG. 10 is a front view of an automatic machine for unloading a film sheet from a magazine, showing a second embodiment of the present invention.
Figure 11:
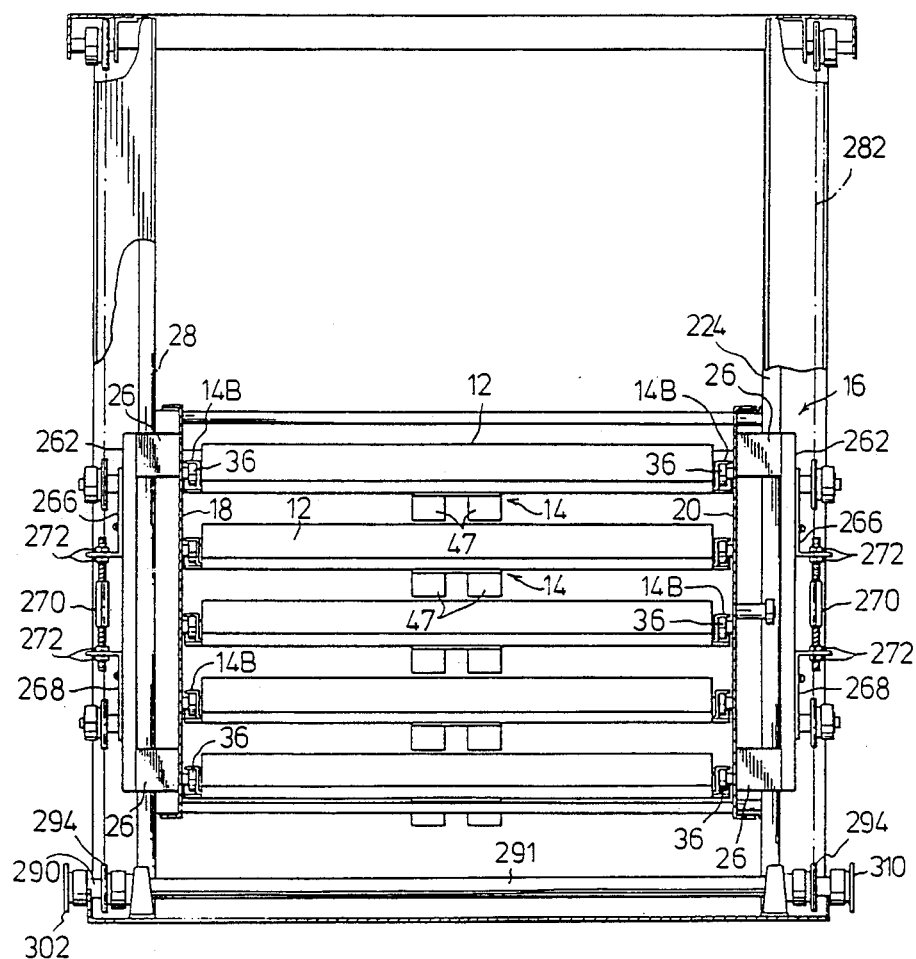
FIG. 11 is a view when looking from the right side of FIG. 10.
Figure 12:
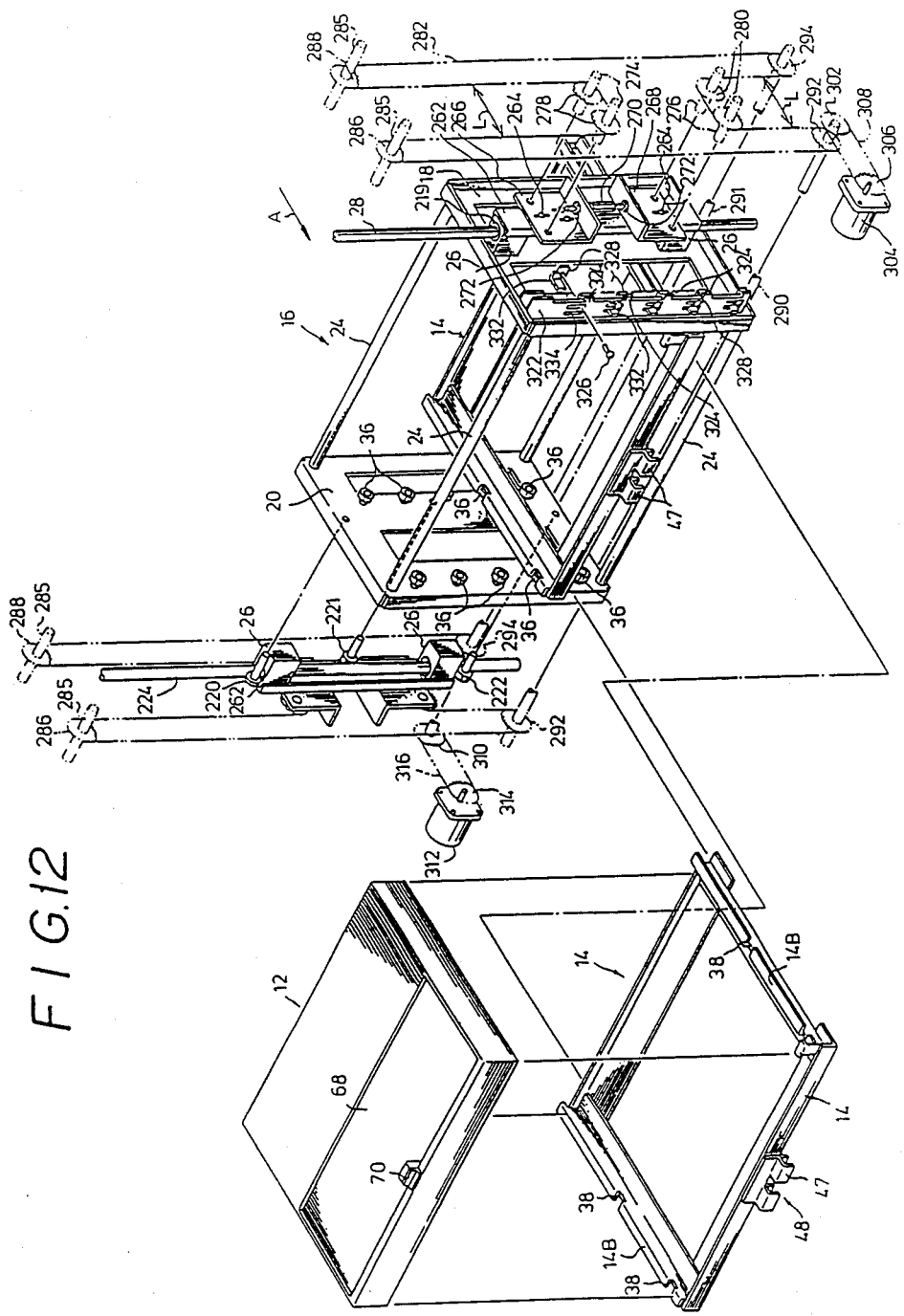
FIG. 12 is an exploded perspective view of the automatic machine of FIG. 10.

As in the first embodiment, the left side (as viewed when looking in the direction indicated by the arrow A in FIG. 10) of the elevator 16 of this embodiment is also provided with the blocks 26, as shown in FIGS. 10 to 12. The guide rod 28 which extends within the frame 11 in the vertical direction is passed through the blocks 26 with bearings 219 provided therebetween. The right side of the elevator 16 is provided with guide rollers 220, 221, and 222 which slide along a guide rod 224 extending within the frame 11 in the vertical direction. Thus, the elevator 16 can be moved up and down while being guided by the guide rods 28 and 224. Although the right side of the elevator 16 is also provided with the blocks 26, no bearings are mounted, and the guide rod 224 is passed through the blocks 26 loosely.

A channel steel 262 is fixed to the blocks 26 provided on each side of the elevator 16, and L-shaped plates 266 and 268 are mounted on each of the channel steels 262 by screws 264. The through-holes of the respective L-shaped plates 266 and 268 through which the screws 264 are passed are made elongated so as to enable the L-shaped plates 266 and 268 to be moved up and down with respect to the corresponding channel steel 262.

A bolt 270 is fixed between the opposing surfaces of each pair of the L-shaped plates 266 and 268 by double nuts 272, whereby the interval between the L-shaped plates 266 and 268 is fixed once it has been set. If the two end portions of the bolt 270 are threaded in the opposite directions, movement of the L-shaped plates 266 and 268 toward and away from each other is facilitated.

A pair of movable sprockets 278 and a pair of movable sprockets 280 are mounted on the L-shaped plates 262 and 268 by shafts 274 and 276, respectively.

Part of an endless chain belt 282 is wound around the movable sprockets 278 and 280. Other parts are wound around fixed sprockets 286 and 288 mounted on shafts 285 rotatably supported to the upper portion of the frame 11 and fixed sprockets 292 and 294 fixed to shafts 290 and 291 rotatably supported to the lower portion of the frame 11, respectively.

More specifically, the interval at which the fixed sprockets 286 and 288 are provided is made to be equal to that between the fixed sprockets 292 and 294. The interval at which the pair of movable sprockets 278 are provided is made to be equal to that between the pair of movable sprockets 280. Portions of the endless chain belt 282 which extend between the pair of the movable sprockets 278 and the fixed sprocket 286 and 288 are made parallel and are separated from each other by a distance L, while portions of the endless chain belt 282 which are extended between the pair of the movable sprockets 280 and the fixed sprocket 292 and 294 are also made parallel and are separated from each other by the same distance L. In other words, the endless chain belt 286 is wound around the movable sprocket 278, the fixed sprocket 286, the fixed sprocket 292, the movable sprockets 280, the fixed sprocket 294, the fixed sprocket 288 and the movable sprocket 278 in this order on each side of the elevator 16. The interval at which the pair of fixed sprockets 286 and 288 and the pair of fixed sprockets 292 and 294 are provided is made sufficiently larger than the vertical movement stroke of the elevator 16.

The fixed sprockets 292 and the fixed sprockets 294 disposed at the two sides of elevator 16 are coupled to each other by a shaft 290 and a shaft 291, respectively. On the left side of the elevator 16 as viewed when looking in the direction indicated by the arrow A, a sprocket 302 is fixed to the distal end of the shaft 290 projecting from the fixed sprocket 292, and a chain belt 308 is stretched between the sprocket 302 and a sprocket 306 on the output shaft of a high-speed motor 304 which constitutes a first driving means. On the right side of the elevator 16, a sprocket 310 is fixed to the distal end of the shaft 291 projecting from the fixed sprocket 294, and a chain belt 316 is stretched between the sprocket 310 and a sprocket 314 on the output shaft of a low-speed motor 312 which constitutes a second driving means. It is preferable for each of the low-speed motor 312 and the high-speed motor 304 to be equipped with a brake.

Figure 13:
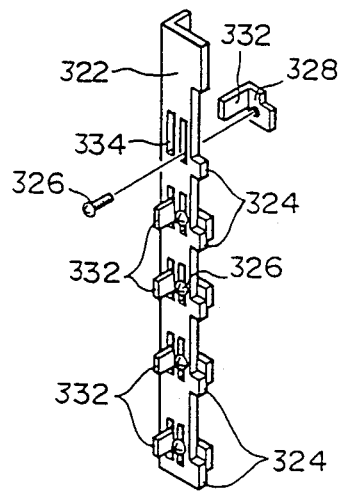
FIG. 13 is a perspective view of a bending plate and its associated parts.

A bending plate 322 such as that shown in FIG. 13 is provided in a projecting manner on the rear of the one side of the elevator 16. A plurality of projections 324 are provided on the distal end surface of the bending plate 322, the number of the projections 324 corresponding to the number of the magazines 12 accommodated in the elevator 16. The height of each of the projections 324 can be adjusted by the provision of a striker 328 on the rear surface of the bending plate 322 by screw 326. A first sensor 336 (FIG. 10) mounted on the frame 11 is actuated by any of these projections. The other end of each of the strikers 328 is provided with a bending piece 332 which is made to project through a slit 334 formed in the bending plate 322 in the forward direction of the elevator 16.

The first sensor 336 detects the lower end of the projection 324 of the magazine 12 containing film sheets of a desired size as the elevator 16 is raised so as to enable the high-speed movement to be completed, and then detects the upper end of the striker 328 so as to ensure that the low-speed movement is stopped and that the magazine is located at the film unloading position.

In addition, a second sensor 330 is mounted adjacent to the first sensor 336 for preventing the overrun of the elevator 16.

The operation of the second embodiment will now be described.

As in the first embodiment, the magazines 12 each of which contains the plurality of X-ray film sheets 13 of a different size from those in the other magazines are loaded on their associated movable trays 14.

At this initial stage, the topmost movable tray 14 and its magazine 12 are aligned with the film unloading mechanism 49. Assuming that the second lowest movable tray 14 is to be aligned with the film unloading mechanism 49, as shown in FIG. 10, the high-speed motor 304 is rotated counterclockwise at a high speed, and at the same time the low-speed motor 312 is rotated clockwise at a low speed, as viewed in FIGS. 10 and 12. This allows the endless chain belt 282 to be moved in the directions indicated by the arrows B and C in FIG. 10 and the fixed sprockets 86 and 288 to be rotated counterclockwise and clockwise, respectively.

As a result, the L-shaped plates 266 and 268 are raised at a high speed through the same distance on each side of the elevator, and the elevator 16 is also raised at a high speed.

When the lower end of the projection 324 corresponding to the magazine 12 located at the second lowest is detected by the first sensor 336, the high-speed motor 304 is stopped but the low-speed motor 312 remains operated. Since the low-speed motor 312 is rotated clockwise as viewed in FIGS. 10 and 12, the endless chain belt 282 is moved in the direction indicated by the arrow C, moving the fixed sprocket 288 clockwise and the movable sprockets 278 and 280 counterclockwise. At this time, the fixed sprockets 286 and 292 are restrained from being rotated owing to the high-speed motor 304. As a result, not only the movable sprockets 278 and 280 but also the elevator 16 are raised at a low speed until the first sensor 336 detects the upper end of the striker 328 so as to enable the second lowest movable tray 14 to be stopped at a position at which it is aligned with the film unloading mechanism 49.

Subsequently, the movable tray 14 is moved in the horizontal direction by the action of the film unloading mechanism 49 in the same way as in the first embodiment. While the movable tray 14 is being moved, the lid 68 is removed by the magnet 66, enabling the pivot arm 90 to take out the sheet of film on the top of the stock by the sucker 86.

After the film sheet has been taken out, the movable tray 14 with the magazine accommodated therein is housed within the elevator 16 by the reverse rotation of the motor 56. The same operation will be repeated to select another film sheet.

In the embodiment described above, the low-speed motor 312 as well as the high-speed motor 304 are driven to move the elevator at high speed. However, the low-speed motor 312 may be stopped at this time. If the two motors are driven, they may be driven at the same speed.

In the first and second embodiments, the horizontal walls 14B of each of the movable trays 14 are each provided with the notches 38 which accommodate parts of the guide rollers 34 and 36. However, a recess of any shape may be provided in place of the notch, if it can accommodate part of the guide roller.

What is claimed is:

1. An automatic machine for unloading film sheets from any of a plurality of magazine, said machine comprising:
    a plurality of movable trays, each of which is loaded with one of said magazines containing film sheets;
    an elevator for moving said movable trays to locate a selected one of said magazines to a retracted position from which said selected magazine is capable of being moved to a film unloading position where the film sheets can be unloaded from said selected magazine;
    a film unloading preparation means including tray driving means operable for driving the movable tray which loads said selected magazine to move it between said retracted position and said film unloading position and engaging means disposed between each of said movable trays and said tray driving means and having a portion connected to said movable trays, said engaging means comprising a hook and an insert member disposed on said tray driving means for movement during operation of said tray driving means to a position for engaging said hook to transmit a driving force of the tray driving means to the movable tray which loads said selected magazine, said portion of said engaging means connected to said movable trays having a notch opening defined therein for allowing said tray driving means to pass through said notch opening during movement of said movable trays by said elevator; and
    a film unloading mechanism for unloading the film sheet from said selected magazine located at said film unloading position.

2. An automatic machine according to claim 1, wherein said hook has said notch opening and an engagement opening and is provided on each of said movable trays, and said insert member is constituted to be moved back and forth along a curved path by said tray driving means, said insert member entering said engagement opening of said hook on the movable tray which loads said selected magazine to thereby engage said hook, said insert member moving the selected magazine from said retracted position to said film unloading position when said insert member is moved on said path in one direction, and said insert member returning said selected magazine to said retracted position and coming out of said engagement opening of said hook when said insert member is moved in the opposite direction.

3. An automatic machine according to claim 2, wherein said tray driving means includes an endless belt moved on a curved track corresponding to said curved path and said insert member is mounted on said endless belt.

4. An automatic machine according to claim 3, wherein said curved track comprises a pair of pulleys between which said endless belt is stretched and said insert member is disposed on one of two portions of said endless belt which are extended parallel between said pair of pulleys when it is located at one end of said curved track and on the other of said two portions when it is located at the other end of said curved track.

5. An automatic machine according to claim 2, wherein said engagement opening of said hook is disposed on a curve portion of said path of said insert member so as to enable said insert member to enter said hook which said insert member is moving on said curved portion.

6. An automatic machine according to claim 1, further comprising at least one guide roller supported on side walls of said elevator, at least one recess provided on said movable tray, and a positioning means provided on said elevator for positioning the movable tray which loads the selected magazine at said retracted position by both said guide roller and recess.

7. An automatic machine according to claim 1, wherein said elevator is provided with at least a pair of guide rollers which face said movable tray, and said pair of guide rollers position said movable tray at said retracted position, and smoothly guide said movable tray from said retracted position to said film unloading position in accordance with the operation of said tray driving means, and said movable tray is provided with at least a pair of recesses which face said rollers, and a pair of said guide rollers get in said recess respectively to restrict the movement of said movable tray toward said film unloading position.

8. An automatic machine according to claim 1, wherein each of said magazines has a magnetic block mounted on a lid, wherein said lid opens the top of the magazine while said magazine is being moved from said retracted position to said film unloading position and which closes the top of the magazine while said magazine is being moved from said unloading position to said retracted position.

9. An automatic machine according to claim 8, further comprising a lid retaining magnet for attracting said magnetic block mounted on said lid to allow it to be moved relative to said magazine while said magazine is moved between said retracted position and said unloading position.

10. An automatic machine for sequentially unloaded film sheets of desired types from a plurality of magazines one by one, comprising:
    (a) movable trays each of which is loaded with one of said magazines;
    (b) an elevator for accommodating said movable trays in parallel and guiding each of said movable trays so as to enable any one of said trays to be moved to a retracted position from which said one of said movable trays is capable of being moved to a film unloading position where the film sheet can be unloaded from said magazine loaded on said one of said movable trays;
    (c) elevator driving means for moving said elevator to a given height to locate said one of said movable trays at said retracted position;
    (d) moving means for moving said one of said movable trays located at said retracted position therefrom to said film unloading position, said moving means including engaging means having a portion connected to said movable trays, said engaging means comprising a hook having an engagement opening and a notch opening and an insert member which enters said engagement opening to transmit a driving force of the tray driving means to the movable tray which loads said selected magazine, said portion of said engaging means connected to said movable trays having said notch opening defined therein for allowing said tray driving means to pass through said notch opening during movement of said movable trays by said elevator;

(e) means for opening a lid of one of the magazines on said one of said movable trays while said one magazine is being moved from said retracted position to said film unloading position; and (f) means for unloading the film sheet located on top from said one magazine.

11. An automatic machine according to claim 10, wherein said moving means includes an endless belt wound around a pair of pulleys and said insert member is mounted on said endless belt.

12. An automatic machine according to claim 11, wherein said insert member is movable along a path of motion defined by said endless belt and said pulleys, and said insert member is disposed on one of two portions of said endless belt which are stretched parallel between said pair of pulleys when said insert member is located at one end of said path of motion and on the other end of said two portions when it is located on the other end of said path of motion.

13. An automatic machine according to claim 10, wherein said engagement opening of said hook disposed on a curved portion of said path of motion of said insert member so as to enable said insert member to enter said engagement opening as it is moved along said curved portion.

14. An automatic machine according to claim 10, further comprising at least one guide roller supported on said walls of said elevator, at least one recess provided on said tray, and a positioning means provided on said elevator for positioning the magazine at said retracted position by both said guide roller and recess.

15. An automatic machine according to claim 10, wherein said elevator is provided with at least a pair of guide rollers which face said movable tray, and said pair of guide rollers position said movable tray at said retracted position, and smoothly guide said movable tray from said retracted position to said film unloading position in accordance with the operation of said tray driving means, and said movable tray is provided with at least a pair of recesses which face said rollers, and a pair of said guide rollers gets in said recess respectively to restrict the movement of said movable tray toward said film unloading position.

16. An automatic machine for unloading a film sheet of a desired type which is selected from different types of film sheets, comprising:

(a) a plurality of magazines each containing a plurality of sheets of film of a type which is different from those contained in the other magazines;

(b) an elevator for accommodating said magazines;

(c) film unloading means disposed at a position which corresponds to a specific position of said elevator; and (d) an elevator driving means for driving said elevator to a retracted position at which the selected one of said magazines is aligned with said film unloading mechanism, wherein said elevator driving means includes: a pair of first fixed winding wheels; a pair of second fixed winding wheels separated from said first fixed winding wheels by an interval which is larger than the movement stroke of said elevator; a pair of movable winding wheels rotatably supported on said elevator; a first elongated body which is wound around one of said movable winding wheels, a first one of said first fixed winding wheels, one of said second fixed winding wheels, and the other of said movable winding wheels in that order; a second elongated body whose two ends are connected to the two ends of said first elongated body and which is wound around the other of said movable winding wheels, the other of said second fixed winding wheels, the other of said first fixed winding wheels, and the one of said movable winding wheels in that order; a first driving means for driving said first winding body; and a second driving means for driving said second winding body.

17. An automatic machine according to claim 16, wherein said first driving means comprises a high-speed motor, and said second driving means comprises a low-speed motor.

18. An automatic machine according to claim 16, wherein said film unloading means includes a film unloading preparation means for moving the movable tray with the selected magazine accommodated therein between said retracted position and a film unloading position where said film sheet can be unloaded from the selected magazine using an insert member which enters a hook provided on each of the movable trays.

19. An automatic machine for unloading film sheets from any of a plurality of magazines, said machine comprising:

a plurality of movable trays, each of which is loaded with one of said magazines containing film sheets;

an elevator for moving said movable trays to locate a selected one of said magazines to a retracted position from which said selected magazine is capable of being moved to a film unloading position where the film sheets can be unloaded from said selected magazine;

a film unloading preparation means including tray driving means operable for driving the movable tray which loads said selected magazine to move it between said retracted position and said film unloading position and engaging means disposed between each of said movable trays and said tray driving means, said engaging means comprising a hook having an engagement opening and a notch opening and an insert member which enters said engagement opening to transmit a driving force of the tray driving means to the movable tray which loads said selected magazine; and a film unloading mechanism for unloading the film sheets from said selected magazine located at said film unloading position, wherein said automatic machine further comprises means for restraining the movable tray at said film unloading position from moving toward said retracted position, said restraining means being separate from said moving means and said elevator.

20. An automatic machine for unloading film sheets from any of a plurality of magazines, said machine comprising:

a plurality of movable trays, each of which is loaded with one of said magazines containing film sheets;

an elevator for moving said movable trays to locate a selected one of said magazines to a retracted position from which said selected magazine is capable of being moved to a film unloading position where the film sheets can be unloaded from said selected magazine;

a film unloading preparation means including tray driving means for driving the movable tray which loads said selected magazine to move it between said retracted position and said film unloading position and engaging means disposed between each of said movable trays and said tray driving means, said engaging means comprising a hook and an insert member which enters said hook to transmit a driving force of the tray driving means to the movable tray which loads said selected magazine; and a film unloading mechanism for unloading the film sheets from said selected magazine located at said film unloading position.

wherein said automatic machine further comprises means for retaining the movable tray at said film unloading position, and wherein said movable tray retaining means comprises a movable tray attracting magnet.

21. An automatic machine for unloading film sheets from any of a plurality of magazines, said machine comprising:

a plurality of movable trays, each of which is loaded with one of said magazines containing film sheets;

an elevator for moving said movable trays to located a selected one of said magazines to a retracted position from which said selected magazine is capable of being moved to a film unloading position where the film sheets can be unloaded from said selected magazine;

a film unloading preparation means including tray driving means for driving the movable tray which loads said selected magazine to move it between said retracted position and said film unloading position and engaging means disposed between each of said movable trays and said tray driving means, said engaging means comprising a hook and an insert member which enters said hook to transmit a driving force of the tray driving means to the movable tray which loads said selected magazine; and a film unloading mechanism for unloading the film sheets from said selected magazine located at said film unloading position, wherein said automatic machine further comprises means for retaining the movable tray at said film unloading position, and pushing means for pushing the magazine loaded in the movable tray located at said film unloading position to one side of said movable tray.

22. An automatic machine according to claim 21, wherein said pushing means employs a spring whose urging force is also used to move the movable tray toward said retracted position, the movement being mainly carried out by said tray driving means.

23. An automatic machine for sequentially unloading film sheets of desired types from a plurality of magazines one by one, comprising:

(a) movable trays each of which is loaded with one of said magazines;

(b) an elevator for accommodating said movable trays in parallel and guiding each of said movable trays so as to enable any one of said trays to be moved to a retracted position from which said one of said movable trays is capable of being moved to a film unloading position where the film sheets can be unloaded from said magazine loaded on said one of said movable trays;

(c) elevator driving means for moving said elevator to a given height to locate said one of said movable trays at said retracted position;

(d) moving means for moving said one of said movable trays located at said retracted position therefrom to said film unloading position;

(e) means for opening a lid of one of the magazines on said one of said movable trays while said one magazine is being moved from said retracted position to said film unloading position; and (f) means for unloading the film sheet located on top from said one magazine, wherein said automatic machine further comprises means for restraining said one of said movable trays at said film unloading position from moving toward said retracted position, said restraining means being separate from said moving means and said elevator.

24. An automatic machine for sequentially unloading film sheets of desired types from a plurality of magazines one by one, comprising:

(a) movable trays each of which is loaded with one of said magazines;

(b) an elevator for accommodating said movable trays in parallel and guiding each of said movable trays so as to enable any one of said trays to be moved to a retracted position from which said one of said movable trays is capable of being moved to a film unloading position where the film sheets can be unloaded from said magazine loaded on said one of said movable trays;

(c) elevator driving means for moving said elevator to a given height to located said one of said movable trays at said retracted position;

(d) moving means for moving said one of said movable trays located at said retracted position therefrom to said film unloading position;

(e) means for opening a lid of one of the magazines on said one of said movable trays while said one magazine is being moved from said retracted position to said film unloading position; and (f) means for unloading the film sheet located on the top from said one magazine, wherein said automatic machine further comprises means for retaining said one of said movable trays at said film unloading means, and said retaining means comprises a movable tray attracting magnet.

25. An automatic machine for sequentially unloading film sheets of desired types from a plurality of magazines one by one, comprising:

(a) movable trays each of which is loaded with one of said magazines;

(b) an elevator for accommodating said movable trays in parallel and guiding means of said movable trays so as to enable any one of said trays to be moved to a retracted position from which said one of said movable trays is capable of being moved to a film unloading position where the film sheets can be unloaded from said magazine loaded on said one of said movable trays;

(c) elevator driving means for moving said elevator to a given height to locate said one of said movable trays at said retracted position;

(d) moving means for moving said one of said movable trays located at said retracted position therefrom to said film unloading position;
(e) means for opening a lid of one of the magazines on said one of said movable trays while said one magazine is being moved from said retracted position to said film unloading position; and
(f) means for unloading the film sheet located on the top from said one magazine,
wherein said automatic machine further comprises means for retaining said one of said movable trays at said film unloading means, and pushing means for pushing said one of said magazines which is loaded on aid one of said movable trays located at said film unloading position to one side of said one of said movable trays.

26. An automatic machine according to claim 25, wherein said pushing means uses a spring whose urging force is also used to move said one of said movable trays toward said retracted position, the movement being mainly carried out by said moving means.

* * * * *